(12) United States Patent
Engel et al.

(10) Patent No.: US 10,484,310 B1
(45) Date of Patent: Nov. 19, 2019

(54) SYSTEM AND METHOD FOR REAL TIME TRANSMISSION AND DISPLAY OF TRACKING DATA

(71) Applicant: MLB Advanced Media, L.P., New York, NY (US)

(72) Inventors: Robert Engel, San Francisco, CA (US); Cory Schwartz, New York, NY (US)

(73) Assignee: MLB ADVANCED MEDIA, L.P., New York, NY (US)

( * ) Notice: Subject to any disclaimer, the term of this patent is extended or adjusted under 35 U.S.C. 154(b) by 0 days.

(21) Appl. No.: 15/694,200

(22) Filed: Sep. 1, 2017

Related U.S. Application Data

(60) Provisional application No. 62/382,889, filed on Sep. 2, 2016.

(51) Int. Cl.
*H04L 12/861* (2013.01)
*H04L 12/26* (2006.01)
*G01S 13/68* (2006.01)
*H04N 21/222* (2011.01)

(52) U.S. Cl.
CPC .......... *H04L 49/90* (2013.01); *H04L 43/0847* (2013.01)

(58) Field of Classification Search
CPC ............................ H04L 49/90; H04L 43/0847
See application file for complete search history.

(56) References Cited

U.S. PATENT DOCUMENTS

| 2002/0107940 | A1* | 8/2002 | Brassil | H04N 21/222 709/219 |
| 2003/0053461 | A1* | 3/2003 | Ross | H04L 49/90 370/394 |
| 2016/0306036 | A1* | 10/2016 | Johnson | G01S 13/68 |

\* cited by examiner

*Primary Examiner* — Kiet Tang
(74) *Attorney, Agent, or Firm* — Foley & Lardner LLP

(57) ABSTRACT

Systems and methods of transmitting data packets in a live data feed are provided. A live data processing system receives a plurality of tracking data packets that are obtained using radar devices and image capturing devices. The live data processing system determines that a particular tracking data packet is missing from the plurality of tracking data packets based on a predetermined order for receiving the plurality of tracking data packets. The live data processing system queues the plurality of tracking data packets. The live data processing system generates a plurality of message packets based on the plurality of tracking data packets and the particular tracking data packet that is received after receiving the plurality of tracking data packets. The live data processing system transmits, in the live data feed, the plurality of message packets in the predetermined order to a plurality of devices for display.

20 Claims, 6 Drawing Sheets

SYSTEM AND METHOD FOR REAL TIME TRANSMISSION AND DISPLAY OF TRACKING DATA

CROSS REFERENCE TO RELATED APPLICATIONS

This application claims the benefit of and priority to U.S. Provisional Application No. 62/382,889 filed Sep. 2, 2016, the disclosure of which is incorporated by reference herein in its entirety.

BACKGROUND

The present disclosure relates generally to communicating packets, including, but not limited to, real-time transmission of radar and camera tracked data in a live data feed via a network to a plurality of client devices for display.

Real-time transmission of data packets in a computer network can be affected by various network conditions. For example, during an event with a large crowd of spectators, the high volume of mobile communications can significantly increase the occurrence of network congestion and failure. Such network congestion and failure can have a severe impact on the proper operations of the computing and communication systems at the event, which are vital to the success of the event and user experience.

SUMMARY

At least one aspect is directed to a method of transmitting data packets in a live data feed. The method includes receiving, by at least one server comprising one or more processors coupled to memory via a first network, a plurality of first tracking data packets according to a plurality of first formats. The plurality of first tracking data packets are associated with a first moving object and are obtained using a plurality of radar devices and a plurality of image capturing devices. The method includes determining, by the at least one server, that a particular first tracking data packet is missing from the plurality of first tracking data packets based on a predetermined order for receiving the plurality of first tracking data packets. The method includes queuing the plurality of first tracking data packets responsive to determining that the particular first tracking data packet is missing from the plurality of first tracking data packets. The method includes receiving the particular first tracking data packet after receiving the plurality of first tracking data packets. The method includes generating a plurality of first message packets according to a plurality of second formats based on the plurality of first tracking data packets and the particular first tracking data packet. The method includes transmitting, in the live data feed via the first network or at least one second network, the plurality of first message packets in the predetermined order for receiving the plurality of first tracking data packets to a plurality of devices for display. The plurality of first message packets includes a particular first message packet generated based on the particular first tracking data packet which is received after receiving the plurality of first tracking data packets. The particular first message packet is transmitted as a packet other than a last packet among the plurality of first message packets according to the predetermined order.

At least one aspect is directed to a system of transmitting data packets in a live data feed. The system includes at least one server comprising one or more processors coupled to memory. The at least one server is configured to receive via a first network a plurality of first tracking data packets according to a plurality of first formats. The plurality of first tracking data packets are associated with a first moving object and are obtained using a plurality of radar devices and a plurality of image capturing devices. The at least one server is configured to determine that a particular first tracking data packet is missing from the plurality of first tracking data packets based on a predetermined order for receiving the plurality of first tracking data packets. The at least one server is configured to queue the plurality of first tracking data packets responsive to determining that the particular first tracking data packet is missing from the plurality of first tracking data packets. The at least one server is configured to receive the particular first tracking data packet after receiving the plurality of first tracking data packets. The at least one server is configured to generate a plurality of first message packets according to a plurality of second formats based on the plurality of first tracking data packets and the particular first tracking data packet. The at least one server is configured to transmit in the live data feed via the first network or at least one second network the plurality of first message packets in the predetermined order for receiving the plurality of first tracking data packets to a plurality of devices for display. The plurality of first message packets includes a particular first message packet generated based on the particular first tracking data packet which is received after receiving the plurality of first tracking data packets. The particular first message packet is transmitted as a packet other than a last packet among the plurality of first message packets according to the predetermined order.

At least one aspect is directed to a method of transmitting data packets in a live data feed. The method includes receiving, by at least one server comprising one or more processors coupled to memory via a first network, a plurality of first tracking data packets and one or more second tracking data packets according to a plurality of first formats. The plurality of first tracking data packets are associated with a first moving object, and the one or more second tracking data packets are associated with a plurality of second objects. The plurality of first tracking data packets and the one or more second tracking data packets are obtained using a plurality of radar devices and a plurality of image capturing devices. The method includes generating, by the at least one server, a plurality of first message packets according to a plurality of second formats based on the plurality of first tracking data packets, and at least one of the generated plurality of first message packets includes a speed field containing a speed associated with the first moving object, and another generated first message packet of the plurality of first message packets includes a distance field containing a distance associated with the first moving object. The method includes generating at least one second message packet according to the plurality of second formats based on the one or more second tracking data packets. The generated at least one second message packet includes a plurality of position data indicating positions of the plurality of second objects in a field and a timestamp indicating a time that the plurality of position data are generated by a tracking system including the plurality of radar devices and the plurality of image capturing devices. Each of the plurality of position data includes a first coordinate, a second coordinate, and a third coordinate associated with a respective second object of the plurality of second objects. The method includes transmitting, in the live data feed via the first network or at least one second network, the plurality of first message packets and the at least one second message packet to a plurality of devices for display, and at least the speed and the distance associated with the first moving object and at least one of the plurality of position data associated with a respective second object of the plurality of second objects are displayed.

BRIEF DESCRIPTION OF THE DRAWINGS

Various objects, aspects, features, and advantages of the exemplary embodiments and implementations of the disclosure will become more apparent and better understood by referring to the detailed description taken in conjunction with the accompanying drawings.

The details of various implementations of the methods and systems are set forth in the accompanying drawings and the description below.

DETAILED DESCRIPTION

Following below are more detailed descriptions of various concepts related to, and implementations of, methods, apparatuses, and systems of transmitting data packets in a live data feed for display at a plurality of client devices. Before turning to the more detailed descriptions and figures, which illustrate the exemplary implementations in detail, it should be understood that the application is not limited to the details or methodology set forth in the descriptions or illustrated in the figures. It should also be understood that the terminology is for the purpose of description only and should not be regarded as limiting.

Figure 1:
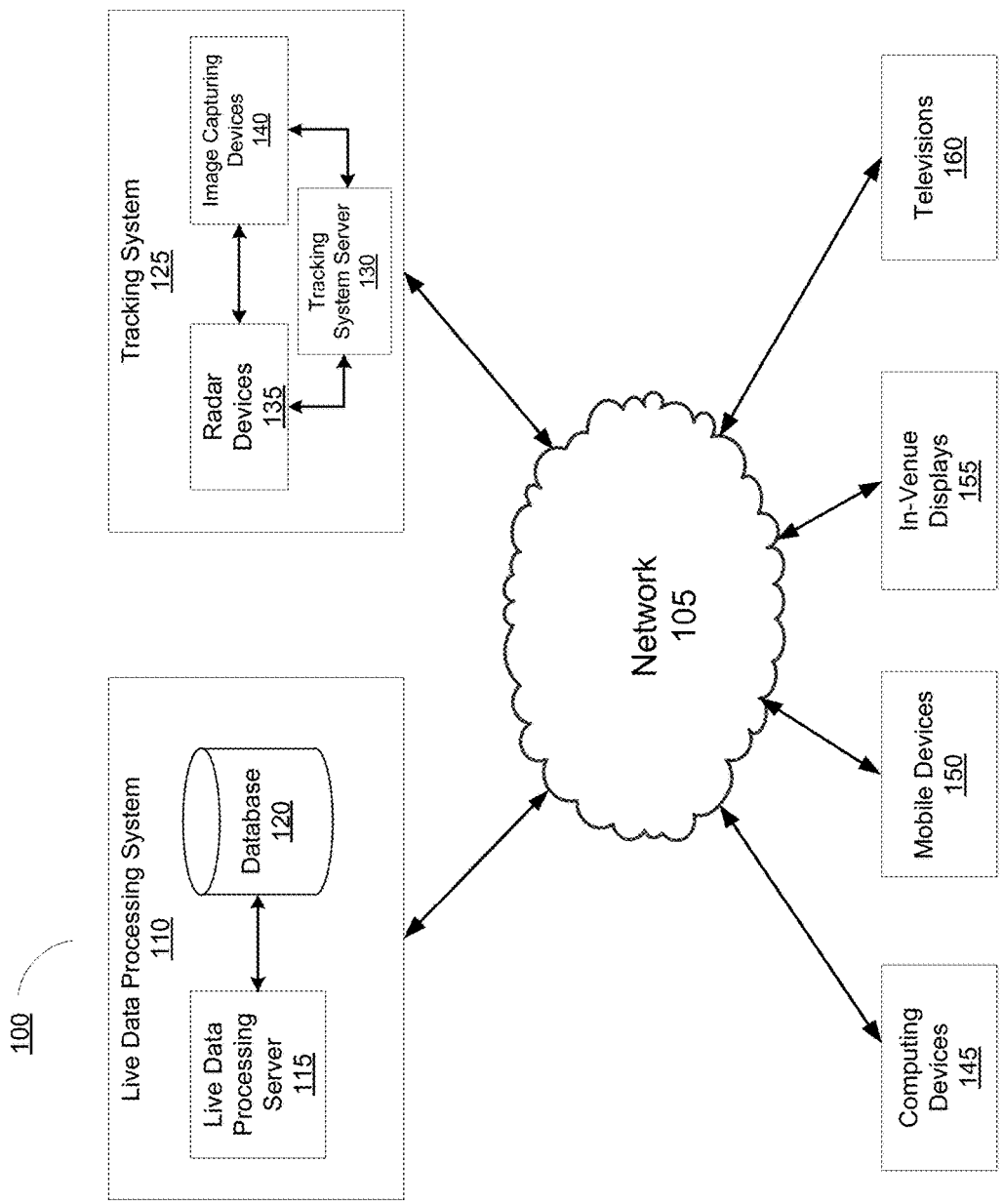
FIG. 1 is a block diagram depicting an example system of transmitting data packets in a live data feed, according to an illustrative implementation.

FIG. 1 is a block diagram depicting an example system 100 of transmitting data packets in a live data feed. The system 100 includes a live data processing system 110 communicating with a tracking system 125 and a plurality of client devices 145, 150, 155 and 160 via a network 105. The network 105 can include any computer networks or communications networks through which information can be transmitted and received. For example, the network 105 can include a local area network (LAN) such as a WiFi network, a wide area network (WAN), a wired or wireless telecommunications network, a television network, a radio network, a satellite network, a cellular network, the Internet, and any other medium through which information can be communicated.

The live data processing system 110 can include one or more live data processing servers 115 and one or more databases 120. The live data processing server 115 can include one or more processors and a memory. The processor can be one or more microprocessors, CPUs, application specific integrated circuits (ASICs) and/or one or more other integrated circuits. The processor can execute instructions stored in non-transitory computer-readable media for performing operations described herein. The memory can include any type of computer memory or electronic storage device capable of providing the processor with program instructions and can include hard disk, tape, floppy disk, memory registers, CD-ROM, DVD, magnetic disk, memory chip, flash memory, read-only memory (ROM), random-access memory (RAM), optical media, etc. The memory can be a non-transitory memory used to store computer-readable instructions that, when executed by the processor, cause the processor to perform the operations described herein. The databases 120 can be local to the live data processing system 110 or can be remote to the live data processing system 110 and communicates with the live data processing system 110 via the network 105. The databases 120 can store historical and statistical data used by the living data processing system 110.

The tracking system 125 can include one or more tracking system servers 130, one or more radar devices 135, and one or more image capturing devices 140. The radar devices 135 can be an array of radar equipment that use radio waves to determine the range, angle or velocity of objects. The image capturing devices 140 can include high-resolution cameras and/or three-dimensional (3D) cameras used to track objects on a field. The radar devices 135 and the image capturing devices 140 can be installed at various locations of a venue or other places where a sporting event, concert or other activities take place. The tracking system server 130 can include one or more processors and a memory, and can be similar to the live data processing server 115 described herein above. In some implementations, the tracking system server 130 can process raw data obtained from the radar devices 135 and the image capturing devices 140 to generate packets and transmit the packets to the live data processing server 115 for further processing. In some implementations, the tracking system server 130 can transmit the raw data obtained from the radar devices 135 and the image capturing devices 140 to the live data processing server 115 for processing. In some implementations, the tracking system 125 can include other tracking devices, such as Global Positioning System (GPS) devices, stringers-utilized devices (e.g., various computing devices and equipment operated by stringers for recording the event), etc.

The plurality of client devices can include computing devices 145, mobile devices 150, in-venue displays 155, and televisions 160. The client devices can receive information from the live data processing system 110 directly or indirectly via the network 105. The computing devices 145 can include any computing devices or personal computers, such as desktops, laptops, workstations, server devices, media servers, home entertainment gateways, etc. The mobile devices 150 can include any portable devices that can be handheld, such as smart phones, tablets, personal digital assistants, etc. The computing devices 145 and mobile devices 150 can receive data from the live data processing system 110 via Internet broadcast or other methods.

The in-venue displays 155 can display information received directly or indirectly from the live data processing system 110. The in-venue displays 155 can include any devices for displaying scores, team information, and other information (e.g., speed and distance associated with a ball) as described herein during a sporting game or other events in a venue or other places where an event occurs. The in-venue displays 155 can include, but not limited to scoreboards, Jumbotrons, ribbon boards, dasher-boards, in-house TVs and display screens, etc. For example, a scoreboard can be a large board for publicly displaying scores, team information, and other game information and can utilize electro-mechanical or electronic means for displaying the information received from the live data processing system 110. For instance, digits displayed on a scoreboard can be composed of large dot-matrix or seven-segment displays made of incandescent bulbs, light-emitting diodes, or electromechanical flip segments and a scoreboard can be operated through a control panel. The televisions 160 can be any telecommunication medium used for displaying/outputting moving images and sounds. The televisions 160 can include set-top boxes as well as Over-The-Top content (OTT) devices, such as Apple TV, Roku, PlayStation, Xbox, Kindle Fire, etc. The televisions 160 can receive information from the live data processing system 110 directly or indirectly via television broadcast or other methods. For example, the televisions 160 can receive data from the live data processing system 110 via programs broadcasted by an entertainment network such as ESPN®.

In some implementations, the live data processing system 110 receives a plurality of first tracking data packets according to a plurality of first formats via the network 105. For example, the live data processing server 115 can receive the first tracking data packets from the tracking system server 130 of the tracking system 125 via the network 105. The tracking system server 130 of the tracking system 125 can generate tracking data packets in the first formats. In some implementations, the first formats can be a set of packet formats for describing different types of data generated by the tracking system 125. For example, the set of packet formats can include a packet format for describing the speed of a ball as soon as it is patched and a packet format for describing the launch data of the ball, such as the angle, the speed, and the direction of the ball. In some implementations, the first formats can be based on a communication protocol. In some implementations, the first formats can be proprietary to the tracking system 125 and can be different depending on different implementations. In some implementations, the live data processing system 110 receives raw data from the tracking system 125.

In some implementations, the plurality of first tracking data packets are associated with a first moving object. In some implementations, the first moving object can be a ball played at a sporting event. For example, the first moving object can be a baseball played at a baseball game, a basketball played at a basketball game, a golf ball played at a golf game, a football played at a football game, etc. The first tracking data packets can contain information describing characteristics or attributes associated with the first moving object, such as the launch data of a ball (e.g., speed, angle, direction), travel data of the ball including coordinates of where the ball lands, etc.

In some implementations, the first tracking data packets are obtained using a plurality of radar devices and a plurality of image capturing devices. For example, the tracking system 125 can include a plurality of radar devices (e.g., an array of radar equipment) and a plurality of image capturing devices (e.g., high-resolution cameras, 3D cameras, etc.) installed at various locations of a venue or other places where a sporting event, concert or other activities can take place. In some implementations, the tracking system 125 can include other tracking devices, such as Global Positioning System (GPS) devices, stringers-utilized devices (e.g., various computing devices and equipment operated by stringers for recording the event), etc. Because the first moving object are tracked by the radar devices, image capturing devices, GPS devices, or other devices at the venue or other places where an event takes place, various data are obtained by the tracking system server 130 in real-time as the actions at the event occur. In some implementations, the tracking system server 130 can process the raw data obtained from the radar devices 135 and the image capturing devices 140 and generate tracking data packets. In some implementations, the tracking system server 130 can transmit the raw data obtained from the radar devices 135 and the image capturing devices 140 to the live data processing system 110 for processing.

In some implementations, the live data processing system 110 examines the received tracking data packets and determines whether the packets are received in a predetermined order. For example, the live data processing server 115 can examine the received tracking data packets and determine whether a particular tracking data packet is missing from a set of tracking data packets based on the predetermined order. The predetermined order can be a specific order within a set of tracking data packets for the live data processing system 110 to receive. As an example in the context of a baseball game, the first tracking data packets may include a pitch release data packet containing information of the speed of the ball as soon as it is pitched (packet #1), a live pitch data packet containing the information of the pitch after it crosses home plate (packet #2), a hit launch data packet containing information of the launch data of the hit ball such as angle/speed/direction (packet #3), and a generic segment data packet containing information of the travel data of the hit ball such as coordinates of where the ball lands (packet #4), in some implementations. In this example, the live data processing system 110 expects to receive the four tracking data packets in the above specified order to properly process the tracking data packets.

Figure 2A:
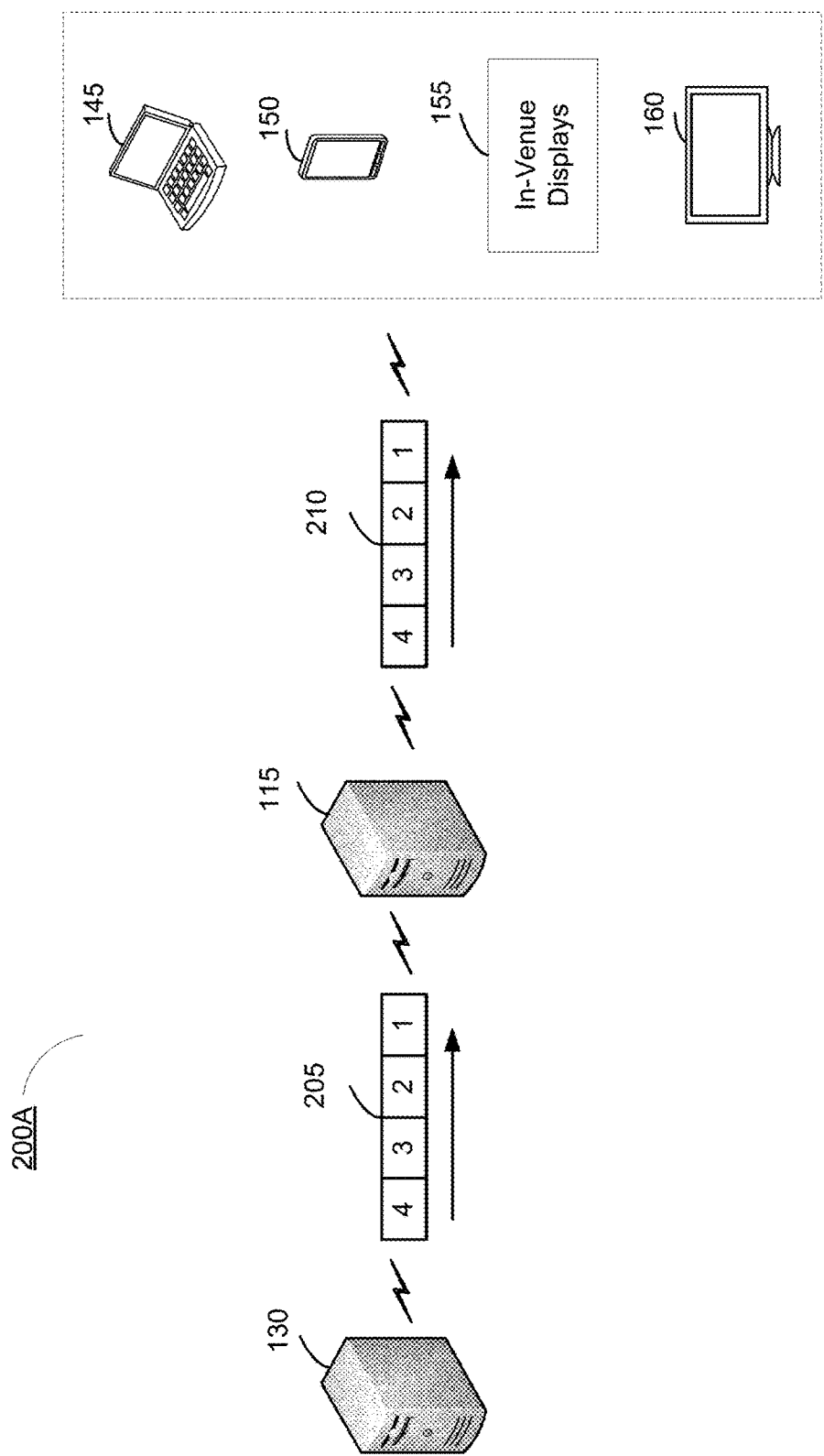
FIG. 2A is a block diagram depicting an example system of transmitting data packets according to a predetermined order in a live data feed under a normal network condition, according to an illustrative implementation.

FIG. 2A is a block diagram depicting an example system 200A of transmitting data packets according to a predetermined order in a live data feed under a normal network condition. Referring to FIG. 2A, the tracking system server 130 of the tracking system 125 transmits a set of tracking data packets 205 to the live data processing server 115 of the live data processing system 110. Continuing with the above example, the set of tracking data packets 205 includes the pitch release data packet (packet #1), the live pitch data packet (packet #2), the hit launch data packet (packet #3), and the generic segment data packet (packet #4). Under normal network conditions, the set of tracking data packets are transmitted to the live data processing server 115 as shown in the predetermined order. The live data processing server 115, upon receiving each tracking data packet in the predetermined order, processes each tracking data packet and generates message packets 210 (which will be described in more detail further herein below), and transmits each message packet in the same order to the client devices 145, 150, 155, 160 for display in real-time (i.e., as the actions occur in the venue and the tracking data are generated by the tracking system 125).

However, the tracking data packets may not be received at the live data processing system 110 in the specific order due to various reasons. For instance, high network traffic during an event can cause the tracking system 125 to send out tracking data packets in an unexpected order. For example, in a highly anticipated sporting event, such as an Olympic game, thousands or even tens of thousands of people presented at the venue where the event occurs may use their mobile devices to perform various operations, such as uploading videos, sending text messages, tweeting, etc. As a result, the data tracking packets generated by the tracking system 125 may have to compete with the local network traffic at the venue for network resources, such as WiFi resources, to transmit the packets out. The high volume network traffic during the event can cause the data packets to bunch up at times and be distributed in an expected order. Under these circumstances, the tracking data packets 205, instead of being received by the live data processing system 110 in the specific order as described above, can be in random orders.

Figure 2B:
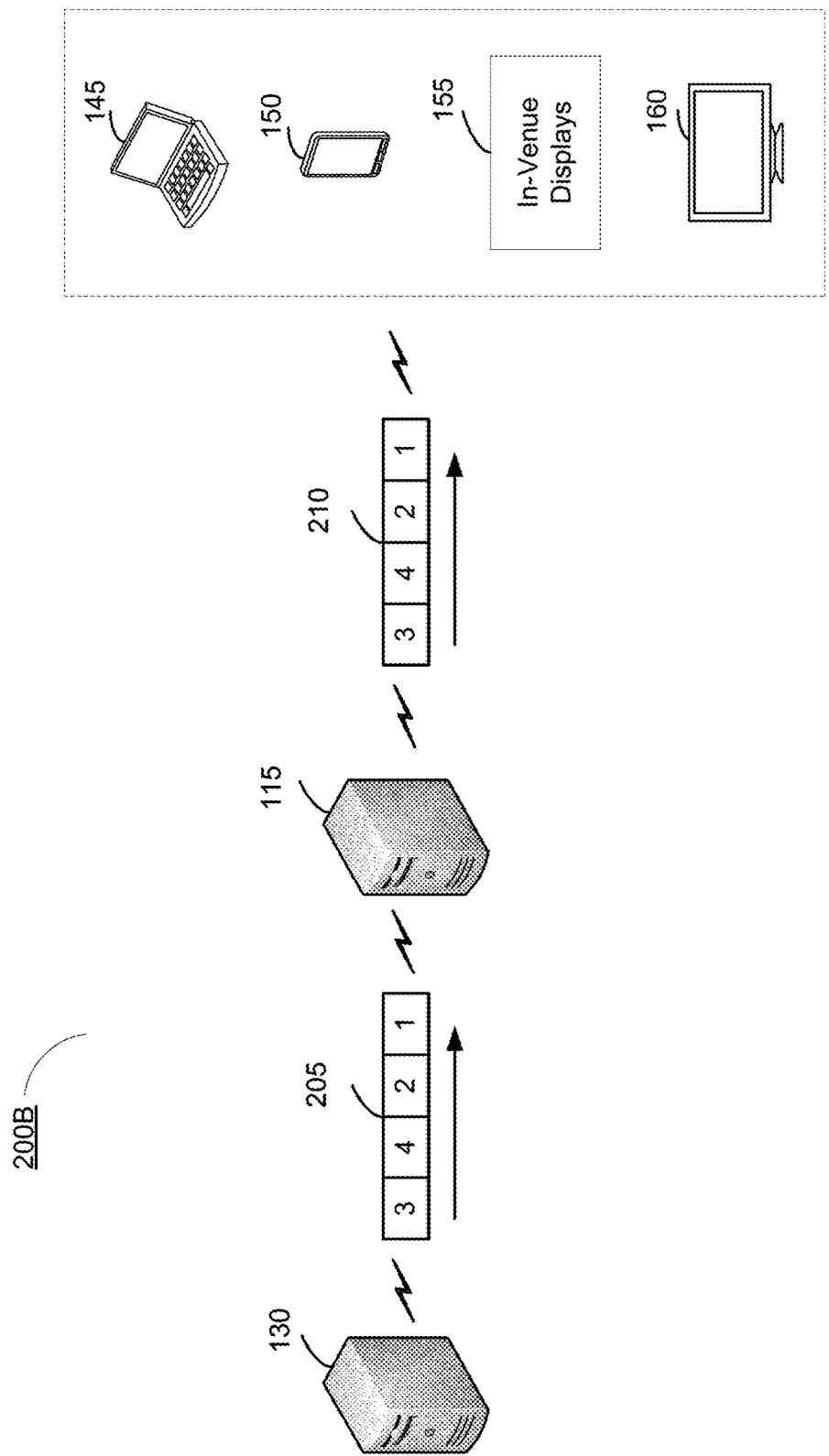
FIG. 2B is a block diagram depicting an example system of transmitting data packets in an unexpected order in a live data feed under abnormal network conditions, according to an illustrative implementation.

FIG. 2B is a block diagram depicting an example system 200B of transmitting data packets in an unexpected order in a live data feed under abnormal network conditions. Referring to FIG. 2B and continuing with the above example, under abnormal network conditions, the tracking data packets 205 can be received at the live data processing system 110 in an unexpected order. For example, the tracking data packets 205, instead of being received by the live data processing server 115 in the predetermined order of #1, #2, #3, and #4, when there are issues with respect to the network traffic as described herein above, the tracking data packets 205 can be received by the live data processing server 115 in the unexpected order of #1, #2, #4, and #3. In the above example, the hit launch data packet (packet #3) can be transmitted by the tracking system server 130 and/or received by the live data processing server 115 after the generic segment data packet (packet #4) is transmitted or received. When the tracking data packets are not received at the live data processing server 115 in the predetermined order, problems can occur. For example, the live data processing system 110 may specify order dependencies based on the inbound tracking data packet specification to ensure timely and accurate data packets to be generated and transmitted to the client devices 145, 150, 155 and 160. When the tracking data packets are not received at the live data processing system 110 in the predetermined order, certain data, such as the speed and the distance of the first moving object, may not be properly processed, in some implementations. As a result, for instance, as shown in FIG. 2B, the live data processing server 115 may transmit the message packets 210 (which will be described in more detail further herein below) in the order of #1, #2, #4, #3. Consequently, certain data contained in the message data packets 210 may not be displayed properly at the client devices 145, 150, 155 and 160. The systems and methods of the present disclosure solve this problem as described herein.

In some implementations, when the live data processing system 110 determines that a particular first tracking data packet is missing from the plurality of first tracking data packets based on a predetermined order for receiving the plurality of first tracking data packets, the live data processing system 110 can queue up all the first tracking data packets until the necessary data is received. For example, the live data processing server 115 can buffer the first tracking data packets in a memory, such as the memory of the live data processing server 115 or the database 120. In some implementations, the particular first tracking data packet is received after receiving the other first tracking data packets and subsequent to the first tracking data packets are queued up at the live data processing system 110. For example, the live data processing server 115 receives the particular first tracking data packet subsequent to receiving the plurality of first tracking data packets.

In some implementations, the live data processing system 110 generates a plurality of first message packets according to a plurality of second formats based on the plurality of first tracking data packets and/or the particular first tracking data packet. For example, the live data processing server 115 can generate the first message packets according to the second formats. If the plurality of first tracking data packets are received in the predetermined order, i.e., no tracking data packet is missing from the first tracking data packets based on the predetermined order, the live data processing server 115 generates the first message packets based on the plurality of first tracking data packets. On the other hand, if the plurality of first tracking data packets are not received in the predetermined order, e.g., a particular tracking data packet is missing from the first tracking data packets, the live data processing server 115 generates the first message packets based on both the plurality of first tracking data packets and the particular first tracking data packet after the particular first tracking data packet is received.

In some implementations, the second formats can be a set of packet formats suitable for transmitting the generated message packets to a plurality client devices and for displaying the information contained in the message packets at the client devices. In some implementations, the second formats can be based on a communication protocol. In some implementations, the second formats can be proprietary to the live data processing system 110 and can be different depending on different implementations. For example, in some implementations, the message packets can be implemented using JavaScript Object Notation (JSON) and the body of each message packet can be a JSON object, with the object identified by a packet type attribute. In some implementations, the message packets can be implemented using other formats, such as .xml and delimited text strings. In some implementations, each message packet can have a message topic and a packet type attribute. For instance, message topics can include "live.ball.data.{venue_id}" and "field.ball.data.{venue_id}," and packet types can include "pitch_release," "pitch_data," "hit_lanch," and "hit_data," in the context of baseball in some implementations. In some implementations, regardless of the message topics or packet types, each message packet includes certain basic metadata. For example, the metadata can include "game_mode" (e.g., 0=batting practice, 1=warm-ups, and 2=live, in the context of baseball in some implementations), "venue_id" (where the game being played), "game_pk" (which can be used to find the game time, visiting and home team information, and other related information, etc.), "player_id" (which can be used to find the players' names, uniform numbers, positions, biographical data and other related information, etc.).

In some implementations, the generated first message packets can include a set of message packets, describing characteristics or attributes of the first moving object when it is in action (e.g., being played) at the event. As an example in the context of baseball, the set of message packets can include a patch release message packet (the speed of the pitch as it leaves the pitcher's hand), a pitch data message packet (the full set of data associated with the pitch as it crosses home plate), a hit launch message packet (the initial properties of each batted ball as it leaves the bat), and a hit data message packet (the initial properties of each batted ball as it leaves the bat plus the distance traveled. For home runs, this can be the projected distance of where the ball would have traveled had it traveled back to field level).

Continuing with the above example, in some implementations, the hit launch message packet can include, among other attributes, a speed attribute/field containing a measured velocity or speed of the hit ball (e.g., in miles per hour (MPH)), an angle attribute/field containing the vertical angle (e.g., in degrees) relative to the horizon at which the hit was launched in degrees), and a direction attribute/field containing the horizontal angle (e.g., in degrees) relative to the line from the center of the rubber to the tip of home plate at which the hit was launched.

Continuing with the above example, in some implementations, the hit data message packet can include an actual distance attribute/field containing the distance (e.g., in feet) where the ball actually lands, e.g., the point where a home run hits a seat in the outfield), and a projected distance attribute/field containing a projected distance (e.g., in feet) from the tip of home plate to the distance where the ball was projected to land had it continued to ground level). In some implementations, the hit data message packet can also include a speed attribute/field, an angle attribute/field, and a direction attribute/field that are same or similar with the speed attribute/field, the angle attribute/field, and the direction attribute/field in the hit launch message packet as described above. In the above example, each message packet can also include a timestamp indicating the time at which the data in packet was generated by the tracking system 125. For instance, the hit launch message packet can include a timestamp indicating a time that the speed, the angle, and the direction are generated by the tracking system 125. Appendix A includes additional attributes/fields of the hit launch message packet and hit data message packet as well as attributes/fields of other exemplary first message packets.

In some implementations, the live data processing system 110 transmits, in a live data feed via the network 105, the plurality of first message packets in the predetermined order for receiving the plurality of first tracking data packets to a plurality of client devices for display. The live data feed, in some implementations, can comprise real-time and continues data streams transmitted from the live data processing system 110 to various client devices, such as computing devices 145, mobile devices 150, in-venue displays 155, and/or televisions 160. For example, the live data processing server 115 can transmit the plurality of first message packets in the predetermined order for receiving the plurality of first tracking data packets to the client devices 145, 150, 155 and 160 for display. In some implementations, the plurality of first message packets are distributed in real-time over a message bus from the live data processing system 110 to numerous client devices. In some implementations, the network 105 can be the same network that the live data processing system 110 receives the first tracking packets from the tracking system 125. In some implementations, the network 105 can be one or more different networks from the network that the live data processing system 110 receives the first tracking packets from the tracking system 125.

In some implementations, the plurality of first message packets generated by the live data processing system 110 can include a particular first message packet that is generated based on the particular first tracking data packet received from the tracking system 125 after receiving the plurality of first tracking data packets. For example, the generated particular first message packet can include a speed field containing a speed associated with the first moving object, an angle field containing an angle associated with the first moving object, and a direction field containing a direction associated with the first moving object. For instance, the generated particular first message packet can be the hit launch message packet as described herein above, in some implementations.

In some implementations, the speed, the angle, and the direction in the particular first message packet is generated based on information contained in the particular first tracking data packet. For example, the particular first tracking data packet that is received after receiving the plurality of first tracking data packets by the live data processing system 110 can include information regarding the speed/velocity, the angle, and the direction of the first moving object. The live data processing server 115, upon receiving the particular first tracking data packet, uses the information contained in the particular first tracking data packet to generate the particular first message packet.

In some implementations, the generated particular first message packet is transmitted to the plurality of client devices as a packet other than a last packet among the plurality of first message packets according to the predetermined order. For example, the generated particular first message packet can be transmitted in the middle of the plurality of first message packets even though the particular first tracking data packet from which the particular first message packet is generated is received after receiving the plurality of first tracking data packet.

Figure 2C:
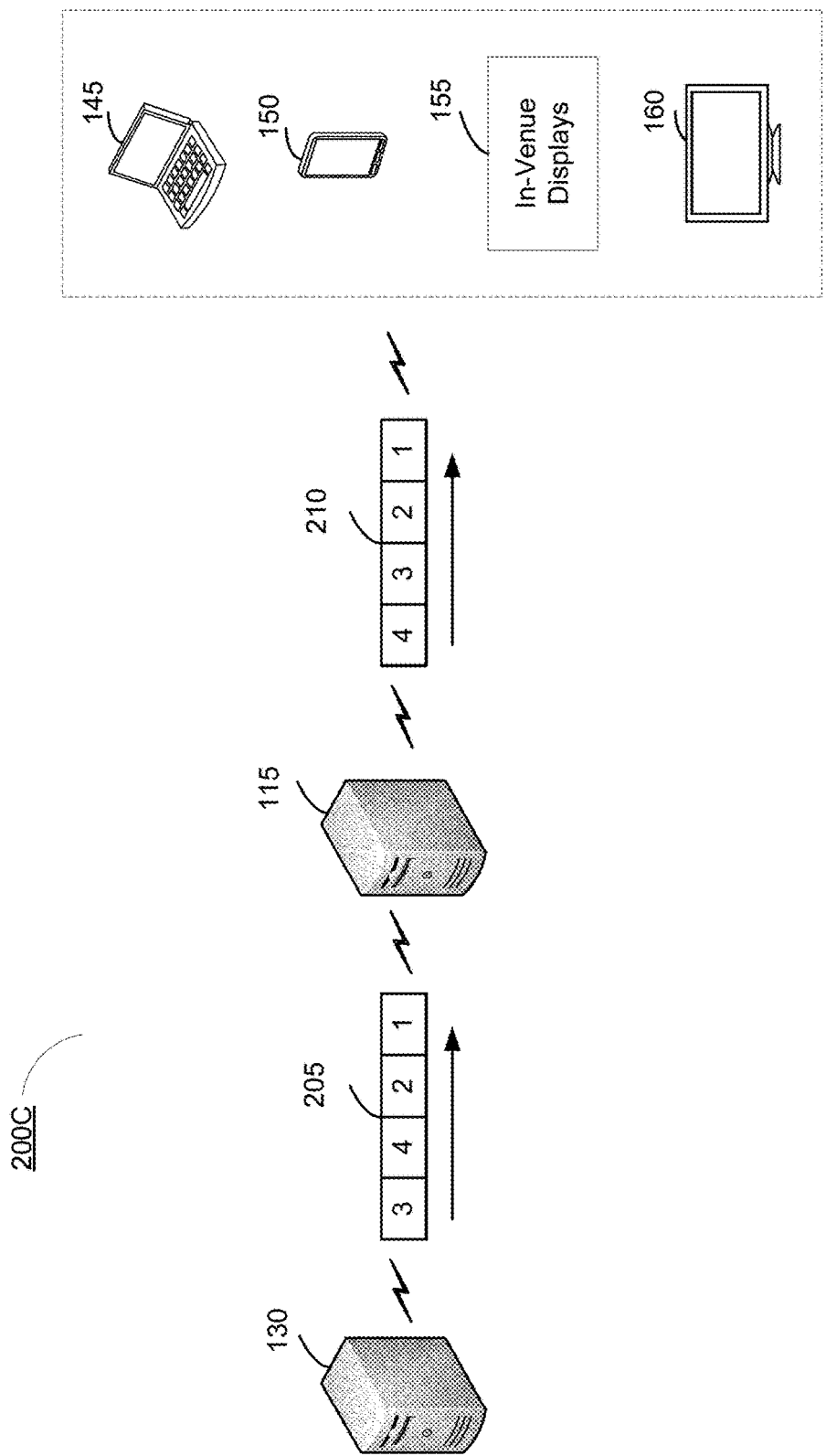
FIG. 2C is a block diagram depicting an example system of transmitting data packets according to a predetermined order in a live data feed under abnormal network conditions, according to an illustrative implementation.

FIG. 2C is a block diagram depicting an example system 200C of transmitting data packets according to a predetermined order in a live data feed under abnormal network conditions. Referring to FIG. 2C and continuing with the example described in relation to FIG. 2B, under abnormal network conditions, the live data processing server 115 may receive the tracking data packets 205 in an unexpected order. For example, instead of receiving the tracking data packets 205 in the predetermined order of packet #1, packet #2, packet #3, and packet #4, the live data processing server 115 may receive the tracking data packets 205 in an unexpected order of packet #1, packet #2, packet #4, and packet #3, due to abnormal network conditions as described herein above. As describes herein above, in some implementations, the live data processing system 110 may specify order dependencies based on the inbound tracking data packet specification to ensure timely and accurate data packets to be generated and transmitted to the client devices 145, 150, 155 and 160. For example, a message packet 210 (e.g., message packet #4) may need information contained in a specific tracking data packet 205 (e.g., tracking data packet #3) to be properly generated. If the message packet 210 (e.g., message packet #4) is generated before the specific tracking data packet 205 (e.g., tracking data packet #3) is received (as the scenario described in relation to FIG. 2B), the message packet 210 (e.g., message packet #4) may not be generated properly and consequently may not be displayed at the client devices properly.

Continuing with the example described above in relation to the particular first tracking data packet and the particular first message packet (where the particular first message packet is generated based on the information contained in the particular first tracking data packet, and the generated particular first message packet contains a speed field, an angle field, and a direction field), a second particular first message packet of the plurality of first message packets may also need the information contained in the particular first tracking data packet to be generated properly. For example, the second particular first message packet of the plurality of first message packets can include an actual distance field containing an actual distance traveled by the first moving object, and a projected distance field containing a projected distance traveled by the first moving object.

Referring again to FIG. 2C, for example, the particular first tracking data packet can be the tracking data packet (205) #3, the particular first message packet can be the message packet (210) #3, and the second particular first message packet can be the message packet (210) #4. In some implementations, the second particular first message packet (e.g., the message packet (210) #4) is generated based on information contained in the particular first tracking data packet (e.g. the tracking data (205) #3), in addition to information contained in a corresponding first tracking data packet (e.g., the tracking data (205) #4). For example, in one implementation, the projected distance of the first moving object (e.g., when the ball is lost by the radar) in the second particular first message packet is generated based on the information (e.g., speed, angle, and/or direction) contained in the particular first tracking data packet. In another implementation, the projected distance of the first moving object in the second particular first message packet is generated using the speed, the angle, and/or the direction of the first moving object in the generated particular first message packet, because the speed, the angle, and the direction of the first moving object have already been generated for the particular first message packet and therefore are more efficient for the second particular first message packet to use, as compared to the implementation of using the information contained in the particular first tracking data packet directly. In both implementations, as can be understood, the generation of the second particular first message packet (e.g., the message packet (210) #4) depends on the particular first tracking data packet (e.g., the tracking data (205) #3) to be received by the live data processing server 115.

In some implementations, the second particular first message packet of the plurality of first message packets can additionally include a speed field containing a speed associated with the first moving object, an angle field containing an angle associated with the first moving object, and a direction field containing a direction associated with the first moving object. In these implementations, the speed, the angle, and the direction of the first moving object in the second particular first message packet can be generated using the speed, the angle, and the direction in the particular first message packet. As can be understood, this is another example that the generation of the second particular first message packet (e.g., the message packet (210) #4) depends on the particular first tracking data packet (e.g. the tracking data (205) #3) to be received by the live data processing server 115.

Referring again to FIG. 2C, the systems and methods described herein can ensure the message packets 210 to be generated properly even under abnormal network conditions. As shown in FIG. 2C, even when the tracking data packets 205 are received at the live data processing server 115 in an unexpected order, the live data processing server 115, by performing the operations as described herein above, can ensure the message packets 210 to be generated and transmitted accurately and timely. In this example, the message packets (210) #3 and #4 can be generated after the tracking data packet (205) #3 is received, and thus utilizing the necessary information contained in the tracking data packet (205) #3. The generated message packets 210, as shown in FIG. 2C, can be transmitted in the predetermined order to the client devices 145, 150, 155, 160. Thus, by performing the real-time data packets generation and transmission accurately and timely, the systems and methods described herein improve network and computing system performance, reduce network congestion and failure, and save computing and networking resources.

In some implementations, the live data processing system 110 can receive one or more second tracking data packets according to the plurality of first formats via the network 105. For example, the live data processing server 115 can receive the one or more second tracking data packets from the tracking system server 130 of the tracking system 125 via the network 105. The tracking system server 130 of the tracking system 125 can generate second tracking data packets in the first formats. As described herein above in relation to the first tracking data packets, the first formats can be a set of packet formats for describing different types of data generated by the tracking system 125. In some implementations, the first formats can be based on a communication protocol. In some implementations, the first formats can be proprietary to the tracking system 125 and can be different depending on different implementations.

In some implementations, the one or more second tracking data packets can contain information associated with a plurality of second objects and are obtained using the radar devices, the image capturing devices, or the Global Positioning System (GPS) devices as described herein above. In some implementations, the second objects can be a plurality of players participated in the sporting event. For example, the second objects can be baseball players, basketball players, golfers, football players, etc. In some implementations, the second objects include coaches or other personnel presented at the sporting or other events.

In some implementations, the live data processing system 110 generates at least one second message packet according to the plurality of second formats based on the one or more second tracking data packets. For example, the live data processing server 115 can generate one or more second message packets using the information contained in the one or more second tracking data packets received from the tracking system 125. As described herein above in relation to the first message packet, the second formats can be a set of packet formats suitable for transmitting the generated message packets to a plurality client devices for display. In some implementations, the second formats can be based on a communication protocol. In some implementations, the second formats can be proprietary to the live data processing system 110 and can be different depending on different implementations.

In some implementations, the second message packet includes a plurality of position data indicating positions of the plurality of second objects in a venue during an event. For example, the second message packet can include a plurality of positions of the players and/or coaches in a venue during a sporting game. In some implementations, each of the position data includes a first coordinate, a second coordinate, and a third coordinate associated with a respective second object of the plurality of second objects. For example, each position data can include a X, Y, Z coordinate position of each person on the field. In some implementations, the X, Y, Z coordinate position of each person on the field is transmitted continuously throughout the game at, for example, 30 frames (or other numbers of frames) per second. Appendix B includes attributes of an exemplary second message packet.

In some implementations, the first coordinate indicates the location of the person in the X coordinate, the second coordinate indicates the location of the person in the Y coordinate, and the third coordinate indicates the location of the person in the Z coordinate in a field coordinate system. An example of a field coordinate system in the context of baseball is shown in Table 1.

TABLE 1

| | |
|---|---|
| Origin (0,0) | The bottom tip of the home plate |
| X-Axis | Parallel to the pitching rubber. Positive values are toward 1st base, and negative values are toward 3rd base. |

TABLE 1-continued

| | |
|---|---|
| Y-Axis | Perpendicular to the pitching rubber, along a straight line from the back tip of home plate, through the pitcher's mound and second base. Positive values are toward the outfield, and negative values are toward the backstop. |
| Z-Axis | Vertical from the ground. Ground level is 0, with positive values above ground level. |

In some implementations, the live data processing system 110 transmits, in the live data feed via the network 105, the at least one second message packet to a plurality of client devices for display. For example, the live data processing server 115 can transmit the at least second message packet via the network 105 to the plurality of client devices 145, 150, 155 and 160 for display in a manner similar to the transmission of the first message packets as described herein above.

In some implementations, the live data processing system 110 can generate metrics message packets based on information in the first tracking data packets, information in the second tracking data packets, other information received from the tracking system 125 or gathered and recorded by stringers, and historical and statistical information stored in the database 120. The metrics message packets can be generated according to the second formats as described herein above. The metrics message packets can be transmitted by the live data processing system 110 via the network 105 to the plurality of client device 145, 150, 155 and 160 for display in a manner similar to the transmission of the first and second message packets as described herein above.

In some implementations, the metrics message packets can include calculated metrics message packets and contextual metrics message packets. The calculated metrics message packets can contain the calculated metrics of the play. The contextual metrics message packets can contain the calculated metrics for the play along with contextual metrics for the league and the players. In some implementations, player measurements are calculated using x, y, z coordinates, and for example in the context of baseball, can include but not limited to pop time, base-to-base time, top speed, arm strength, running effectiveness, agility and quickness, etc. Appendix C includes attributes of exemplary metrics message packets, and Appendix E includes some exemplary metrics described by the metrics message packets.

In some implementations, each of the message packets as described above (e.g., the first message packets, the second message packets, and the metrics message packets) contains various additional fields/attributes. For example, each of the message packets can contain a timestamp indicating the time at which the data in packet was generated by the tracking system 125. Appendixes A, B, and C include exemplary message packets generated by the live data processing system 110.

In some implementations, data contained in the message packets are displayed at the client devices. In some implementations, at least a launch speed and a landing distance associated with the first moving object are displayed at the client devices. In some implementations, at least one of the plurality of position data associated with a respective second object of the plurality of second objects are displayed at the client devices. For example, in the context of baseball, batted ball launch speed and landing distance as well as advanced player metrics upon completion of a play can be displayed at the in-venue displays 155. For example, batted ball launch speed and landing distance, advanced player metrics upon completion of a play, and league/player average for each metric that provide additional context can be displayed at the computing devices 145, the mobile devices 150, and the televisions 160.

Figure 3:
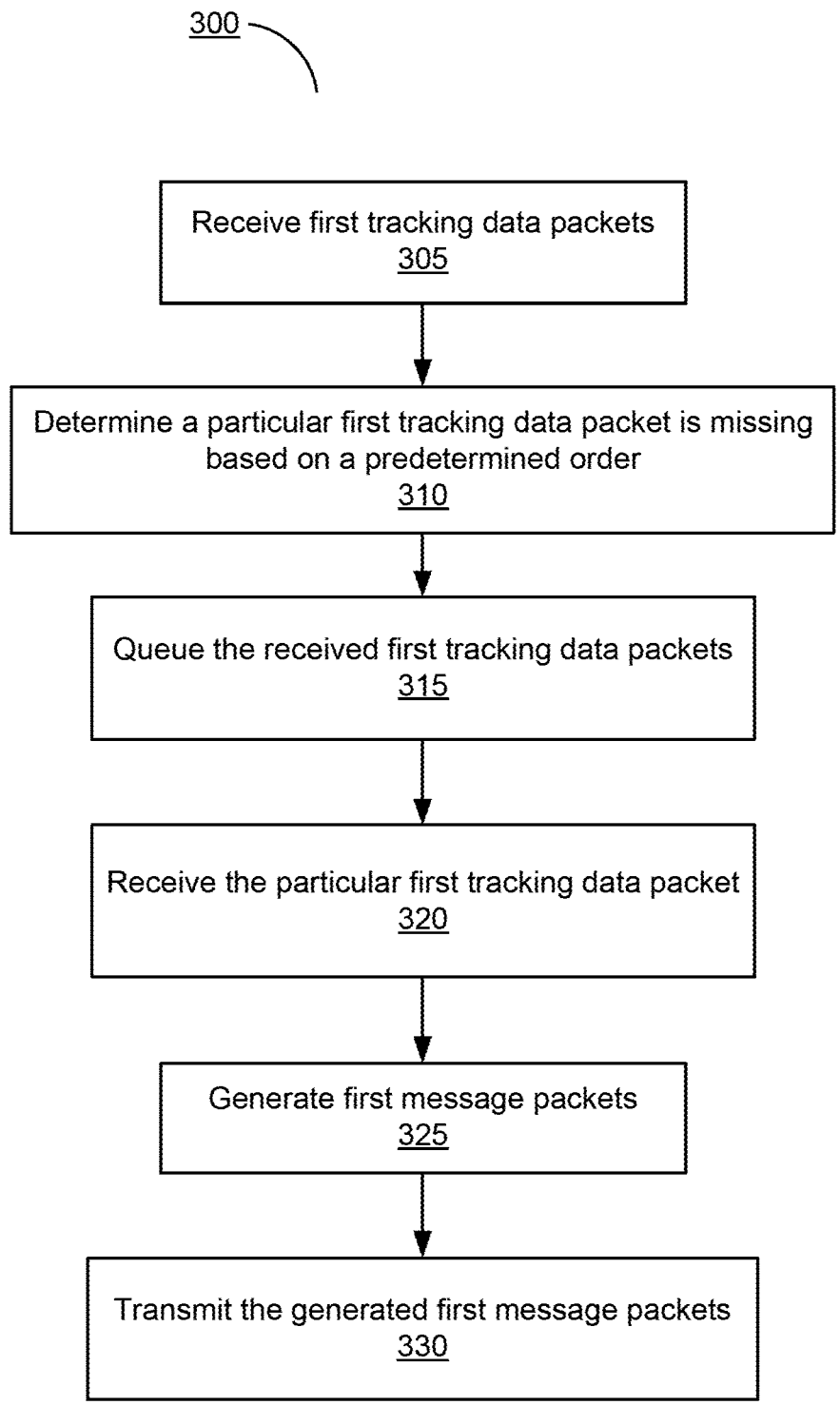
FIG. 3 is a flow diagram depicting an example method of transmitting data packets in a live data feed, according to an illustrative implementation.

FIG. 3 is a flow diagram depicting an example method 300 of transmitting data packets in a live data feed. In some implementations, the method 300 can include receiving, by at least one server comprising one or more processors coupled to memory via a first network, a plurality of first tracking data packets according to a plurality of first formats (operation 305). For example, a live data processing server of a live data processing system can receive the plurality of first tracking data packets according to the plurality of first formats via a computer network. The plurality of first tracking data packets can be generated and transmitted from a tracking system to the live data processing system. The first formats can be a set of packet formats for describing different types of data generated by the tracking system. In some implementations, the first formats can be based on a communication protocol. In some implementations, the first formats can be proprietary to the tracking system and can be different depending on different implementations.

In some implementations, the plurality of first tracking data packets are associated with a first moving object, for example, a ball played at a sporting event. The first tracking data packets can contain information describing characteristics or attributes associated with the first moving object, such as a speed, an angle, a direction, and a distance associated with the ball. In some implementations, the first tracking data packets are obtained using a plurality of radar devices and a plurality of image capturing devices of the tracking system, as described herein above in this disclosure. In some implementations, a tracking system server of the tracking system can process the raw data obtained from the radar devices and the image capturing devices, and generate tracking data packets. In some implementations, the tracking system server can transmit the raw data to the live data processing server for processing.

In some implementations, the method 300 can include determining that a particular first tracking data packet is missing from the plurality of first tracking data packets based on a predetermined order for receiving the plurality of first tracking data packets (operation 310). For example, the live data processing server can examine the received tracking data packets and determine whether a particular tracking data packet is missing from a set of tracking data packets based on the predetermined order. The predetermined order can be a specific order within a set of tracking data packets for the live data processing system to receive and can be determined based on an inbound tracking data packet specification to ensure timely and accurate data packets to be generated and transmitted to client devices.

In some implementations, the method 300 can include queuing the plurality of first tracking data packets responsive to determining that the particular first tracking data packet is missing from the plurality of first tracking data packets (operation 315). For example, the live data processing server can buffer the first tracking data packets in a memory or storage device. In some implementations, the method 300 can include receiving the particular first tracking data packet after receiving the plurality of first tracking data packets (operation 320). For example, the live data processing server can receive the particular first tracking data packet subsequent to receiving the plurality of first tracking data packets and queuing up the plurality of first tracking data packets.

In some implementations, the method 300 can include generating a plurality of first message packets according to a plurality of second formats based on the plurality of first tracking data packets and the particular first tracking data packet (operation 325). For example, the live data processing server can generate the first message packets according to the second formats. The second formats can be a set of packet formats suitable for transmitting the generated message packets to a plurality client devices and for displaying the information contained in the message packets at the client devices. In some implementations, the second formats can be based on a communication protocol. In some implementations, the second formats can be proprietary to the live data processing system and can be different depending on different implementations.

In some implementations, the method 300 can include transmitting, in the live data feed via the first network or at least one second network, the plurality of first message packets in the predetermined order for receiving the plurality of first tracking data packets to a plurality of devices for display (operation 330). The live data feed can comprise real-time and continues data streams transmitted from the live data processing system to various client devices. The plurality of devices can comprise an in-venue display, a television, a personal computer, and/or a mobile device. The network can be the same network that the live data processing system receives the first tracking packets from the tracking system or can be one or more different networks. In some implementations, at least a speed and a distance associated with the first moving object are displayed at the plurality of devices.

In some implementations, the plurality of first message packets can include a particular first message packet generated based on the particular first tracking data packet that is received after receiving the plurality of first tracking data packets. For example, the generated particular first message packet can include a speed field containing a speed associated with the first moving object, an angle field containing an angle associated with the first moving object, and a direction field containing a direction associated with the first moving object. The speed, the angle, and the direction in the particular first message packet can be generated based on information contained in the particular first tracking data packet.

In some implementations, the generated particular first message packet can be transmitted as a packet other than a last packet among the plurality of first message packets according to the predetermined order. For example, the generated plurality of first message packets can also include a second particular first message packet, and the particular first message packet proceeds the second particular first message packet in the plurality of first message packets when the plurality of first message packets are transmitted to the client devices.

In some implementations, the second particular first message packet of the plurality of first message packets can include an actual distance field containing an actual distance traveled by the first moving object, and a projected distance field containing a projected distance traveled by the first moving object. In some implementations, the projected distance of the first moving object in the second particular first message packet can be determined using the speed and the angle of the first moving object in the particular first message packet.

In some implementations, the second particular first message packet of the plurality of first message packets can include a speed field containing a speed associated with the first moving object, an angle field containing an angle associated with the first moving object, a direction field containing a direction associated with the first moving object, in addition to a distance field containing a distance traveled by the first moving object. In some implementations, the speed, the angle, and the direction of the first moving object in the second particular first message packet can be determined based on the speed, the angle, and the direction in the particular first message packet.

Figure 4:
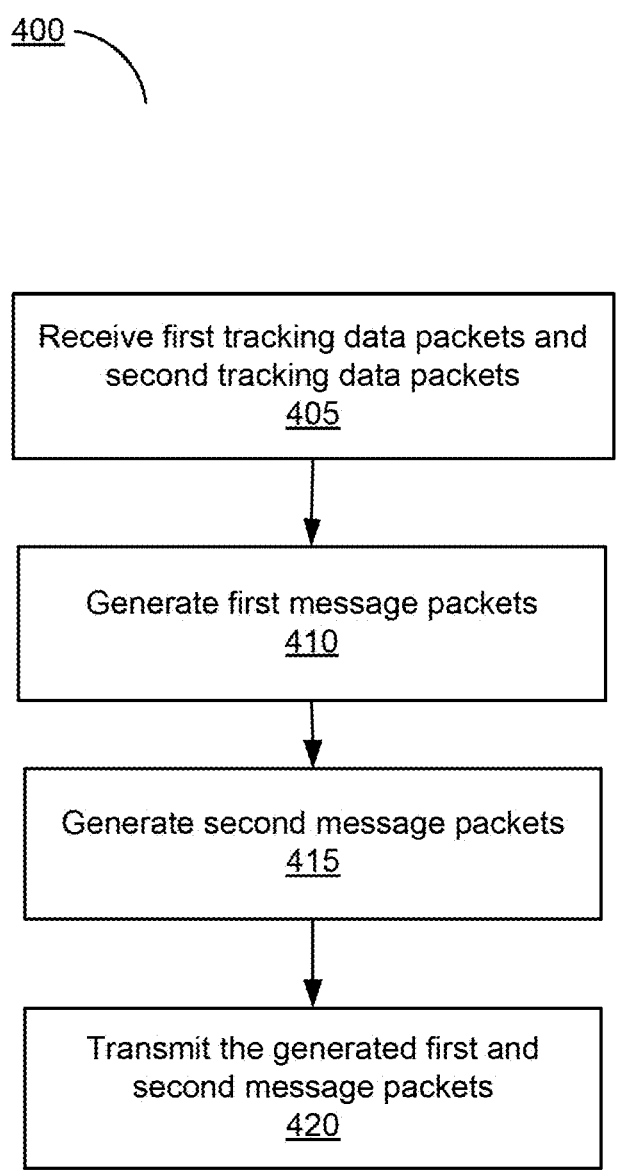
FIG. 4 is a flow diagram depicting an example method of transmitting data packets in a live data feed, according to an illustrative implementation.

FIG. 4 is a flow diagram depicting an example method 400 of transmitting data packets in a live data feed. In some implementations, the method 400 can include receiving, by at least one server comprising one or more processors coupled to memory via a first network, a plurality of first tracking data packets and one or more second tracking data packets according to a plurality of first formats (operation 405). For example, a live data processing server of a live data processing system can receive the plurality of first tracking data packets and one or more second tracking data packets according to a plurality of first formats via a computer network. The first tracking data packets and the second tracking data packets can be generated and transmitted from a tracking system to the live data processing system. The first formats can be a set of packet formats for describing different types of data generated by the tracking system. In some implementations, the first formats can be based on a communication protocol. In some implementations, the first formats can be proprietary to the tracking system and can be different depending on different implementations.

In some implementations, the plurality of first tracking data packets are associated with a first moving object, and the one or more second tracking data packets are associated with a plurality of second objects. For example, the first moving object can include a ball played in a sporting event, and the second objects can include a plurality of players participated in the sporting event. In some implementations, the second objects can also include coaches or other personnel presented at the sporting or other events. In some implementations, the plurality of first tracking data packets and the one or more second tracking data packets are obtained using radar devices, image capturing devices, GPS devices, and/or other devices as described herein above in this disclosure.

In some implementations, the method 400 can include generating a plurality of first message packets according to a plurality of second formats based on the plurality of first tracking data packets (operation 410). For example, the live data processing server can generate the first message packets according to the second formats. The second formats can be a set of packet formats suitable for transmitting the generated message packets to a plurality client devices and for displaying the information contained in the message packets at the client devices. In some implementations, the second formats can be based on a communication protocol. In some implementations, the second formats can be proprietary to the live data processing system and can be different depending on different implementations.

In some implementations, at least one of the plurality of first message packets includes a speed field containing a speed associated with the first moving object, an angle field containing an angle associated with the first moving object, a direction field containing a direction associated with the first moving object, and a timestamp indicating a time that the speed, the angle, and the direction are generated by the tracking system including radar devices and the image capturing devices. In some implementations, another first message packet of the plurality of first message packets includes a distance field containing a distance associated with the first moving object. In some implementations, the at least one of the plurality of first message packets proceeds the another first message packet in the plurality of first message packets according to a predetermined order such that the distance of the first moving object in the another first message packet can be determined using at least the speed and the angle of the first moving object in the at least one of the plurality of first message packets.

In some implementations, the method 400 can include generating at least one second message packet according to the plurality of second formats based on the one or more second tracking data packets (operation 415). For example, the live data processing server can generate the second message packet according to the second formats as described herein above in relation to the first message packets. In some implementation, the second message packet can include a plurality of position data indicating positions of the plurality of second objects in a field, and each of the plurality of position data can include a first coordinate, a second coordinate, and a third coordinate associated with a respective second object of the plurality of second objects. The second message packet can also include a timestamp indicating a time that the plurality of position data are generated by the tracking system which includes the radar devices and the image capturing devices.

In some implementations, the method 400 can include transmitting, in the live data feed via the first network or at least one second network, the plurality of first message packets and the at least one second message packet to a plurality of devices for display (operation 420). The live data feed can comprise real-time and continues data streams transmitted from the live data processing system to various client devices. The plurality of devices can comprise an in-venue display, a television, a personal computer, and/or a mobile device. The network can be the same network that the live data processing system receives the first and second tracking packets from the tracking system or can be one or more different networks. In some implementations, at least the speed and the distance associated with the first moving object and at least one of the plurality of position data associated with a respective second object of the plurality of second objects are displayed at the plurality of devices.

The systems and methods described herein can improve network and computing system performance, reduce network congestion and failure, and save networking and computing resources by performing the real-time packets generation and transmission timely, effectively and efficiently. The real-time generation and display of both the launch/exit speed and the distance (including the actual distance where the first moving object lands and the projected distance when the first moving object is lost by the radar) of the first moving object along with other data and metrics as described herein provide significant advantages over conventional systems. As a result of the systems and methods described herein, data captured in real-time by radars and cameras while an event is in progress, such as the launch/exit speed and the landing distance of the ball, can be displayed timely and accurately at numerous client devices including in-venue displays (e.g., scoreboards, etc.) located at the venue where the event is going on. Accordingly, the systems and methods described herein not only overcome a networking problem and improve networking and computing system performances in the field of communication, but also significantly enhance viewing experience of the event.

While embodiments described herein may be implemented in the context of a baseball game, it will be recognized that the various embodiments may also be implemented to provide real-time data for transmission in a live data feed and display at various client devices in the context of other events, including other sporting events and non-sporting events. For instance, real-time data descriptive of basketball, football, hockey, soccer, golf or other sporting event may also be provided in accordance with various embodiments. For instance, data descriptive of a non-sporting event, such as market trading, concert, television show, and/or the like, in which, for instance, data from the non-sporting event can be used for transmission in a live data feed for display at various client devices.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software embodied or stored in non-transitory computer-readable medium, or combinations of both. To clearly illustrate this interchangeability of hardware and software embodied in non-transitory computer-readable medium, various illustrative components, blocks, modules, circuits, and steps have been described above generally in terms of their functionality. Whether such functionality is implemented as hardware or software stored in non-transitory computer-readable medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative blocks, methods, operations described in connection with the embodiments disclosed herein may be implemented or performed with a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any processors, controllers, microcontrollers, CPU etc. A processor may also be implemented as a combination of computing devices, e.g., a combination of a DSP and a microprocessor, a plurality of microprocessors, one or more microprocessors in conjunction with a DSP core, or any other such configuration.

The steps of a method or operation described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary non-transitory storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software embodied in a non-transitory computer readable medium, firmware, or any combination thereof. Such hardware, software embodied in a non-transitory computer readable medium, firmware, or any combination thereof may part of or implemented with any one or combination of the servers, databases, associated components in the system, components thereof, and/or the like. A computer-readable storage media may be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

APPENDIX A

Attributes of exemplary first message packets in the context of baseball as described in this disclosure.

1. Packet Type=Pitch_Release

The speed of the pitch as it leaves the pitcher's hand.
Attributes:

| | |
|---|---|
| packet_type: | Packet identifier. |
| game_pk: | Globally unique identifier for each game. |
| timestamp: | The time at which the data in the packet was generated by the tracking system, in UTC, formatted as yyyy-mm-ddTHH:MM:SS.SSS |
| game_mode: | Indicates game state: 0 (batting practice), 1 (warm-ups), or 2 (live game). |
| id: | Globally unique identifier for each play. |
| venue_id: | the unique identifier for the venue from which the data is being transmitted. |
| batter_id: | the unique six-digit identifier for the current batter. |
| pitcher_id: | the unique six-digit identifier for the current pitcher. |
| speed: | The velocity of the pitch as it is released from the pitcher's hand. (MPH) |

2. Packet Type=Pitch_Data

The full set of data associated with the pitch as it crosses home plate.
Attributes:

| | |
|---|---|
| packet_type: | Packet identifier. |
| game_pk: | Globally unique identifier for each game. |
| timestamp: | The time at which the data in the packet was generated by the tracking system, in UTC, formatted as yyyy-mm-ddTHH:MM:SS.SSS |
| game_mode: | Indicates game state: 0 (batting practice), 1 (warm-ups), or 2 (live game). |
| id: | Globally unique identifier for each play. |
| venue_id: | The unique identifier for the venue from which the data is being transmitted. |
| batter_id: | The unique six-digit identifier for the current batter. |
| pitcher_id: | The unique six-digit identifier for the current pitcher. |
| speed: | The velocity of the pitch as it is released from the pitcher's hand. (MPH) |
| perceived_speed: | The perceived velocity of the pitch, adjusted to the release point. (MPH) |
| type: | Pitch type identifier. |
| Release Data: | An array containing release data for pitch. |
| Releasespeed: | Speed of pitch when released out of the pitchers hand. (MPH) |
| Angle: | The vertical angle relative to the horizon at which the pitch was released. (degrees) |
| Direction: | The horizontal angle relative to the line from the center of the rubber to the tip of home plate at which the pitch was released. Positive toward 3B. (degrees) |
| SpinAxis: | The axis of rotation for the ball at release given as an angle that reflects how the spin will influence the ball trajectory. Pure back-spin is 180 degrees, pure side-spin that puts the ball to the 1B side is 90 degrees, pure-side spin that pulls the ball to the 3B side is 270 degrees, and pure top-spin is 0 or 360 degrees. (degrees) |
| ReleasePosition: | An array of the (X,Y,Z) coordinates where the ball was released. (feet) X: Position of the X coordinate when released. Y: Position of the Y coordinate when released. Z: Position of the Z coordinate when released. |
| Extension: | The pitcher extension at the time of release. Measured as the distance in the Y coordinate from the front of the pitching rubber at which the ball was released. (feet) |
| ReducedConfidence: | Used internally for debugging purposes. |
| TrajectoryData: | An array containing trajectory data for pitch. |
| VerticalBreak: | The total amount of vertical break of the pitch. Vertical break is measured in the vertical plane at the front face of home plate as the difference in the vertical position of the ball crossing and where the ball would have crossed if it had moved on a straight line following the direction in which it was released (i.e., if no acceleration acted on the ball). (feet) |
| VerticalBreakInduced: | The amount of vertical break that the player induced on the pitch trajectory. This is found by compensating VerticalBreak by the amount of vertical break that can be attributed to gravity. (feet) |
| HorizontalBreak: | The amount of horizontal break of the Pitch. Measured in the vertical plane at the front of home plate as the difference in the vertical position of the ball crossing and where the ball would have crossed if it had moved on a straight line following the direction in which it was released (i.e. if no acceleration acted on the ball). Positive for break toward 3B. (feet) |
| Location: | An array of the (X,Y,Z) position of the ball as it crossed the vertical plane at the front face of home plate. |

|  |  |
|---|---|
|  | X: Position of the X coordinate when crossing the front face of home plate.<br>Y: Position of the Y coordinate when crossing the front face of home plate.<br>Z: Position of the Z coordinate when crossing the front face of home plate. |
| ZoneSpeed: | The speed of the pitch as it crossed the vertical plane at the front face of home plate. (MPH) |
| EffectiveVelocity: | Given the actual velocity and extension of the pitch, Effective Velocity is a measure of the velocity that the pitch would have had to be released at, if the pitcher had an extension that was equal to the average extension of Major League Baseball pitchers. If the actual extension is shorter than the MLB average, the Effective Velocity is lower than the actual velocity, and if the extension is longer, the Effective Velocity is higher than the actual velocity. |
| VerticalApproachAngle: | The angle relative to the horizon at which the ball crosses the vertical plane at the front face of home plate. (degrees) |
| HorizontalApproachAngle: | The angle relative to the line from the center of the rubber to the tip of home plate at which crosses the vertical plane at the front face of home plate. Positive for direction toward 3B. (degrees) |
| ZoneTime: | Time after the release when the ball passes the vertical plane at the front face of home plate. (seconds) |
| Pfxdata: | An array containing Pitch-f/x data parameters calculated from the radar measurement. Given in the same units and coordinates as the current Pitch-f/x system.<br>A0:<br>X:<br>Y:<br>Z:<br>V0:<br>X:<br>Y:<br>Z:<br>X0:<br>X:<br>Y:<br>X: |
| PfxVert: | Vertical movement of the ball. (inches) |
| PfxHorz: | Horizontal movement of the ball. (inches) |
| TrajectoryPolynomialX: | Polynomial coefficients for the X component of the pitch trajectory. First coefficient in array is 0 degree coefficient and subsequent coefficients increase the degree by one each. The polynomial for a pitch is always a second order polynomial. (feet) |
| TrajectoryPolynomialY: | Polynomial coefficients for the Y component of the pitch trajectory. First coefficient in array is 0 degree coefficient and subsequent coefficients increase the degree by one each. The polynomial for a pitch is always a second order polynomial. (feet) |
| TrajectoryPolynomialZ: | Polynomial coefficients for the Z component of the pitch trajectory. First coefficient in array is 0 degree coefficient and subsequent coefficients increase the degree by one each. The polynomial for a pitch is always a second order polynomial. (feet) |

3. Packet Type=Hit_Launch

The initial properties of each batted ball as it leaves the bat.

Attributes:

|  |  |
|---|---|
| packet_type: | Packet identifier. |
| game_pk: | Globally unique identifier for each game. |
| timestamp: | The time at which the data in the packet was generated by the tracking system, in UTC, formatted as yyyy-mm-ddTHH:MM:SS.SSS |
| game_mode: | Indicates game state: 0 (batting practice), 1 (warm-ups), or 2 (live game). |
| id: | Globally unique identifier for each play. |
| venue_id: | The unique identifier for the venue from which the data is being transmitted. |
| batter_id: | The unique six-digit identifier for the current batter. |
| pitcher_id: | The unique six-digit identifier for the current pitcher. |
| speed: | The measured velocity of the hit ball. (MPH) |
| angle: | The vertical angle relative to the horizon at which the hit was launched (degrees): 0 is if the ball was hit exactly parallel to ground level. Negative values are less than this angle (i.e. grounders). |
| direction: | The horizontal angle relative to the line from the center of the rubber to the tip of home plate at which the hit was launched (degrees): 0 is right back at pitcher; −45 is down the 3B line; 45 is down the 1B line. |

4. Packet Type=Hit_Data

The initial properties of each batted ball as it leaves the bat plus the distance traveled. For home runs, this is the projected distance of where the ball would have traveled had it traveled back to field level.

Attributes:

|  |  |
|---|---|
| packet_type: | Packet identifier. |
| game_pk: | Globally unique identifier for each game. |
| timestamp: | The time at which the data in the packet was generated by the tracking system, in UTC, formatted as yyyy-mm-ddTHH:MM:SS.SSS |
| game_mode: | Indicates game state: 0 (batting practice), 1 (warm-ups), or 2 (live game). |
| id: | Globally unique identifier for each play. |
| venue_id: | The unique identifier for the venue from which the data is being transmitted. |
| batter_id: | The unique six-digit identifier for the current batter. |
| pitcher_id: | The unique six-digit identifier for the current pitcher. |
| speed: | The measured velocity of the batted ball. (MPH) |
| angle: | The vertical angle relative to the horizon at which the hit was launched (degrees): 0 is if the ball is hit exactly parallel to ground level. Negative values are less than this angle (i.e. grounders). |
| direction: | The horizontal launch vector of the ball, with −45 being down the 3rd base line, 0 directly back at the pitcher, and 45 down the 1st base line. (degrees) |

| | |
|---|---|
| distance: | The distance from the tip of home plate to the distance where the ball was projected to land had it continued to ground level. (feet) |
| actual_distance: | The distance where the ball actually lands; for instance, the point where a home run hits a seat in the outfield. (feet) |
| projected_x: | The "x" coordinate of the projected distance value |
| projected_y: | The "y" coordinate of the projected distance value. |
| actual_x: | The "x" coordinate of the actual distance value. |
| actual_y: | The "y" coordinate of the actual distance value. |

APPENDIX B

Attributes of an exemplary second message packet in the context of baseball as described in this disclosure.
Packet Type=Positions
The x,y,z coordinate position of each person on the field, sent continuously throughout the game—including during batting practice, warmups and between innings—at, for example, 30 frames per second.
Attributes:

| | |
|---|---|
| packet_type: | Packet identifier. |
| game_pk: | Globally unique identifier for each game. |
| timestamp: | The time at which the data in the packet was generated by the tracking system, in UTC, formatted as yyyy-mm-ddTHH:MM:SS.SSS |
| game_mode: | Indicates game state: 0 (batting practice), 1 (warm-ups), or 2 (live game). |
| id: | Globally unique identifier for each play. |
| venue_id: | The unique identifier for the venue from which the data is being transmitted. |
| batter_id: | The unique six-digit identifier for the current batter. |
| pitcher_id: | The unique six-digit identifier for the current pitcher. |
| positions: | An array of the (X,Y,Z) position of each person on the field. (See Table 1 for an exemplary field coordinate system and Appendix D for an exemplary list of numeric player identifiers.) X: Location of the person in the X coordinate. Y: Location of the person in the Y coordinate. Z: Location of the person in the Z coordinate. |

APPENDIX C

Attributes of exemplary metrics message packets in the context of baseball as described in this disclosure.
1. Packet Type=Calculated_Metrics
The calculated metrics for the play.
Attributes:

| | |
|---|---|
| packet_type: | Packet identifier. |
| game_pk: | Globally unique identifier for each game. |
| timestamp: | The time at which the data in the packet was generated by the tracking system, in UTC, formatted as yyyy-mm-ddTHH:MM:SS.SSS |
| game_mode: | Indicates game state: 0 (batting practice), 1 (warm-ups), or 2 (live game). |
| id: | Globally unique identifier for each play. |
| venue_id: | The unique identifier for the venue from which the data is being transmitted. |
| batter_id: | The unique six-digit identifier for the current batter. |
| pitcher_id: | The unique six-digit identifier for the current pitcher. |
| metrics: | Indicates the start of the array of metrics for the play. |
| type_id: | (See Appendix E for an exemplary list of metrics and their identifiers.) |
| value: | The value of the metric. |
| unit: | The unit of measurement for the metric (seconds, feet, etc.). |
| category: | Batting, pitching, fielding or baserunning. |
| name: | The name of the metric. |
| description: | A description of what the metric defines. |
| position: | The position identifier to whom the metric applies. (See Appendix D for an exemplary list of numeric player identifiers.) |
| player_id: | The unique six-digit identifier for the player to whom the metric applies. |

2. Packet Type=Contextual_Metrics
The calculated metrics for the play along with contextual metrics for the league and the player.
Attributes:

| | |
|---|---|
| packet_type: | Packet identifier. |
| game_pk: | Globally unique identifier for each game. timestamp: The time at which the data in the packet was generated by the tracking system, in UTC, formatted as yyyy-mm-ddTHH:MM:SS.SSS |
| game_mode: | Indicates game state: 0 (batting practice), 1 (warm-ups), or 2 (live game). |
| id: | Globally unique identifier for each play. |
| venue_id: | The unique identifier for the venue from which the data is being transmitted. |
| batter_id: | The unique six-digit identifier for the current batter. |
| pitcher_id: | The unique six-digit identifier for the current pitcher. |
| metrics: | Indicates the start of the array of metrics for the play. |
| type_id: | (See Appendix E for an exemplary list of metrics and their identifiers.) |
| value: | The value of the metric. |
| unit: | The unit of measurement for the metric (seconds, feet, etc.). |
| category: | Batting, pitching, fielding or baserunning. |
| name: | The name of the metric. |
| description: | A description of what the metric defines. |
| position: | The position identifier to whom the metric applies. (See Appendix D for an exemplary list of numeric player identifiers.) |
| player_id: | The unique six-digit identifier for the player to whom the metric applies. |
| league_top_player: | The unique six-digit identifier for the player who has recorded the highest value in the league in this metric. |
| league_top_100: | The rank for this metric for this play, among the top 100 such plays in the league. |
| league_max: | The highest value recorded in the league this season for this metric. |
| league_min: | The lowest value recorded in the league this season for this metric. |
| league_avg: | The average value recorded in the league this season for this metric. |
| player_top_100: | The rank for this metric for this play, among the top 100 such plays this season by this player. |
| player_max: | The highest value recorded by this player this season for this metric. |
| player_min: | The lowest value recorded by this player this season for this metric. |
| player_avg: | The average value recorded by this player this season for this metric. |

APPENDIX D

Exemplary player identification numbering in the context of baseball.

| Type ID | Person |
|---|---|
| 1 | Pitcher |
| 2 | Catcher |

-continued

| Type ID | Person |
|---|---|
| 3 | First Baseman |
| 4 | Second Baseman |
| 5 | Third Baseman |
| 6 | Shortstop |
| 7 | Left Fielder |
| 8 | Center Fielder |
| 9 | Right Fielder |
| 10 | Batter |
| 11 | Runner on 1st |
| 12 | Runner on 2nd |
| 13 | Runner on 3rd |
| 14 | Home Plate Umpire |
| 15 | 1st Base Umpire |
| 16 | 2nd Base Umpire |
| 17 | 3rd Base Umpire |
| 18 | 1st Base Coach |
| 19 | 3rd Base Coach |
| 20 | Left Field Umpire |
| 21 | Right Field Umpire |
| 22 | Manager |
| 23 | Batting Coach |
| 24 | Pitching Coach |
| 25 | Bench Coach |

APPENDIX E

Exemplary metrics in the context of baseball.

| Metric Name | Type ID |
|---|---|
| Acceleration | 1011 |
| Arm Strength | 1018 |
| Distance Covered | 1023 |
| Exchange | 1024 |
| First Step | 1007 |
| First to Home | 1016 |
| First to Second | 1035 |
| First to Third | 1015 |
| Home to First | 1012 |
| Home to Home | 1029 |
| Home to Second | 1013 |
| Home to Third | 1014 |
| Pop Time | 1026 |
| Primary Lead | 1009 |
| Route Efficiency | 1022 |
| Second to Home | 1017 |
| Second to Third | 1036 |
| Secondary Lead | 1010 |
| Third to Home | 1037 |
| Throw Distance | 1038 |
| Top Acceleration | 1032 |
| Top Speed | 1008 |

The invention claimed is:

1. A method of transmitting data packets in a live data feed, comprising:
receiving, by at least one server comprising one or more processors coupled to memory via a first network, a plurality of first tracking data packets according to a plurality of first formats, wherein the plurality of first tracking data packets are associated with a first moving object and are obtained using a plurality of radar devices and a plurality of image capturing devices;
determining, by the at least one server, that a particular first tracking data packet is missing from the plurality of first tracking data packets based on a predetermined order for receiving the plurality of first tracking data packets;
responsive to determining that the particular first tracking data packet is missing from the plurality of first tracking data packets, queuing the plurality of first tracking data packets;
receiving the particular first tracking data packet after receiving the plurality of first tracking data packets;
generating a plurality of first message packets according to a plurality of second formats based on the plurality of first tracking data packets and the particular first tracking data packet; and
transmitting, in the live data feed via the first network or at least one second network, the plurality of first message packets in the predetermined order for receiving the plurality of first tracking data packets to a plurality of devices for display, wherein a particular first message packet generated based on the particular first tracking data packet, which is received after receiving the plurality of first tracking data packets, is transmitted as a packet other than a last packet among the plurality of first message packets according to the predetermined order.

2. The method of claim 1, wherein at least a speed and a distance associated with the first moving object are displayed at the plurality of devices.

3. The method of claim 1, wherein the plurality of devices comprise an in-venue display, and at least one of a television, a personal computer, or a mobile device.

4. A method of transmitting data packets in a live data feed, comprising:
receiving, by at least one server comprising one or more processors coupled to memory via a first network, a plurality of first tracking data packets according to a plurality of first formats, wherein the plurality of first tracking data packets are associated with a first moving object and are obtained using a plurality of radar devices and a plurality of image capturing devices;
determining, by the at least one server, that a particular first tracking data packet is missing from the plurality of first tracking data packets based on a predetermined order for receiving the plurality of first tracking data packets;
responsive to determining that the particular first tracking data packet is missing from the plurality of first tracking data packets, queuing the plurality of first tracking data packets;
receiving the particular first tracking data packet after receiving the plurality of first tracking data packets;
generating a plurality of first message packets according to a plurality of second formats based on the plurality of first tracking data packets and the particular first tracking data packet; and
transmitting, in the live data feed via the first network or at least one second network, the plurality of first message packets in the predetermined order for receiving the plurality of first tracking data packets to a plurality of devices for display, wherein a particular first message packet generated based on the particular first tracking data packet, which is received after receiving the plurality of first tracking data packets, is transmitted as a packet other than a last packet among the plurality of first message packets according to the predetermined order;
wherein the generated particular first message packet includes a speed field containing a speed associated with the first moving object, an angle field containing an angle associated with the first moving object, and a direction field containing a direction associated with the first moving object, and wherein the speed, the angle, and the direction in the particular first message packet is generated based on information contained in the particular first tracking data packet.

5. The method of claim 4, wherein a second particular first message packet of the plurality of first message packets includes an actual distance field containing an actual distance traveled by the first moving object, and a projected distance field containing a projected distance traveled by the first moving object.

6. The method of claim 5, wherein the particular first message packet proceeds the second particular first message packet in the plurality of first message packets according to the predetermined order, the method further comprising:

determining the projected distance of the first moving object in the second particular first message packet based at least in part on the speed and the angle of the first moving object in the particular first message packet.

7. The method of claim 4, wherein a second particular first message packet of the plurality of first message packets includes a distance field containing a distance traveled by the first moving object, a speed field containing a speed associated with the first moving object, an angle field containing an angle associated with the first moving object, and a direction field containing a direction associated with the first moving object, and wherein the speed, the angle, and the direction of the first moving object in the second particular first message packet are based on the speed, the angle, and the direction in the particular first message packet.

8. The method of claim 7, wherein the first moving object comprises a ball played in a sporting event, and the plurality of second objects comprise a plurality of players participated in the sporting event.

9. A method of transmitting data packets in a live data feed, comprising:

receiving, by at least one server comprising one or more processors coupled to memory via a first network, a plurality of first tracking data packets according to a plurality of first formats, wherein the plurality of first tracking data packets are associated with a first moving object and are obtained using a plurality of radar devices and a plurality of image capturing devices;

determining, by the at least one server, that a particular first tracking data packet is missing from the plurality of first tracking data packets based on a predetermined order for receiving the plurality of first tracking data packets;

responsive to determining that the particular first tracking data packet is missing from the plurality of first tracking data packets, queuing the plurality of first tracking data packets;

receiving the particular first tracking data packet after receiving the plurality of first tracking data packets;

generating a plurality of first message packets according to a plurality of second formats based on the plurality of first tracking data packets and the particular first tracking data packet; and transmitting, in the live data feed via the first network or at least one second network, the plurality of first message packets in the predetermined order for receiving the plurality of first tracking data packets to a plurality of devices for display, wherein a particular first message packet generated based on the particular first tracking data packet, which is received after receiving the plurality of first tracking data packets, is transmitted as a packet other than a last packet among the plurality of first message packets according to the predetermined order;

receiving, via the first network, one or more second tracking data packets according to the plurality of first formats, wherein the one or more second tracking data packets are associated with a plurality of second objects and are obtained using at least one of the plurality of radar devices, the plurality of image capturing devices, or a plurality of Global Positioning System (GPS) devices;

generating at least one second message packet according to the plurality of second formats based on the one or more second tracking data packets, wherein the at least one second message packet includes a plurality of position data indicating positions of the plurality of second objects in a venue during an event, each of the position data includes a first coordinate, a second coordinate, and a third coordinate associated with a respective second object of the plurality of second objects; and transmitting, in the live data feed, the at least one second message packet to the plurality of devices for display.

10. A system of transmitting data packets in a live data feed, comprising:

at least one server comprising one or more processors coupled to memory, the at least one server configured to:

receive a plurality of first tracking data packets according to a plurality of first formats, wherein the plurality of first tracking data packets are associated with a first moving object and are obtained using a plurality of radar devices and a plurality of image capturing devices;

determine that a particular first tracking data packet is missing from the plurality of first tracking data packets based on a predetermined order for receiving the plurality of first tracking data packets;

queue the plurality of first tracking data packets responsive to determining that the particular first tracking data packet is missing from the plurality of first tracking data packets;

receive the particular first tracking data packet subsequent to receiving the plurality of first tracking data packets;

generate a plurality of first message packets according to a plurality of second formats based on the plurality of first tracking data packets and the particular first tracking data packet; and transmit, in the live data feed via the first network or at least one second network, the plurality of first message packets in the predetermined order for receiving the plurality of first tracking data packets to a plurality of devices for display, wherein a particular first message packet generated based on the particular first tracking data packet, which is received after receiving the plurality of first tracking data packets, is transmitted as a packet other than a last packet among the plurality of first message packets according to the predetermined order.

11. The system of claim 10, wherein the first moving object comprises a ball played in a sporting event;

wherein the plurality of devices comprise an in-venue display and at least one of a television, a personal computer, or a mobile device, and wherein at least a speed and a distance associated with the first moving object are displayed at the plurality of devices.

12. A system of transmitting data packets in a live data feed comprising:

at least one server comprising one or more processors coupled to memory, the at least one server configured to:

receive a plurality of first tracking data packets according to a plurality of first formats, wherein the plurality of first tracking data packets are associated with a first moving object and are obtained using a plurality of radar devices and a plurality of image capturing devices;

determine that a particular first tracking data packet is missing from the plurality of first tracking data packets based on a predetermined order for receiving the plurality of first tracking data packets;

queue the plurality of first tracking data packets responsive to determining that the particular first tracking data packet is missing from the plurality of first tracking data packets;

receive the particular first tracking data packet subsequent to receiving the plurality of first tracking data packets;

generate a plurality of first message packets according to a plurality of second formats based on the plurality of first tracking data packets and the particular first tracking data packet; and transmit, in the live data feed via the first network or at least one second network, the plurality of first message packets in the predetermined order for receiving the plurality of first tracking data packets to a plurality of devices for display, wherein a particular first message packet generated based on the particular first tracking data packet, which is received after receiving the plurality of first tracking data packets, is transmitted as a packet other than a last packet among the plurality of first message packets according to the predetermined order;

wherein the generated particular first message packet includes a speed field containing a speed associated with the first moving object, an angle field containing an angle associated with the first moving object, and a direction field containing a direction associated with the first moving object, and wherein the speed, the angle, and the direction in the particular first message packet is generated based on information contained in the particular first tracking data packet.

13. The system of claim 12, wherein a second particular first message packet of the plurality of first message packets includes an actual distance field containing an actual distance traveled by the first moving object, and a projected distance field containing a projected distance traveled by the first moving object.

14. The system of claim 13, wherein the particular first message packet proceeds the second particular first message packet in the plurality of first message packets according to the predetermined order, further comprising the at least one server configured to:

determine the projected distance of the first moving object in the second particular first message packet based at least in part on the speed and the angle of the first moving object in the particular first message packet.

15. The system of claim 12, wherein a second particular first message packet of the plurality of first message packets includes a distance field containing a distance traveled by the first moving object, a speed field containing a speed associated with the first moving object, an angle field containing an angle associated with the first moving object, and a direction field containing a direction associated with the first moving object, and wherein the speed, the angle, and the direction of the first moving object in the second particular first message packet are based on the speed, the angle, and the direction in the particular first message packet.

16. A system of transmitting data packets in a live data feed further comprising:

at least one server comprising one or more processors coupled to memory, the at least one server configured to:

receive a plurality of first tracking data packets according to a plurality of first formats, wherein the plurality of first tracking data packets are associated with a first moving object and are obtained using a plurality of radar devices and a plurality of image capturing devices;

determine that a particular first tracking data packet is missing from the plurality of first tracking data packets based on a predetermined order for receiving the plurality of first tracking data packets;

queue the plurality of first tracking data packets responsive to determining that the particular first tracking data packet is missing from the plurality of first tracking data packets;

receive the particular first tracking data packet subsequent to receiving the plurality of first tracking data packets;

generate a plurality of first message packets according to a plurality of second formats based on the plurality of first tracking data packets and the particular first tracking data packet; and transmit, in the live data feed via the first network or at least one second network, the plurality of first message packets in the predetermined order for receiving the plurality of first tracking data packets to a plurality of devices for display, wherein a particular first message packet generated based on the particular first tracking data packet, which is received after receiving the plurality of first tracking data packets, is transmitted as a packet other than a last packet among the plurality of first message packets according to the predetermined order;

wherein the at least one server is further configured to:

receive, via the first network, one or more second tracking data packets according to the plurality of first formats, wherein the one or more second tracking data packets are associated with a plurality of second objects and are obtained using at least one of the plurality of radar devices, the plurality of image capturing devices, or a plurality of Global Positioning System (GPS) devices;

generate at least one second message packet according to the plurality of second formats based on the one or more second tracking data packets, wherein the at least one second message packet includes a plurality of position data indicating positions of the plurality of second objects in a venue during an event, each of the position data includes a first coordinate, a second coordinate, and a third coordinate associated with a respective second object of the plurality of second objects; and transmit, in the live data feed, the at least one second message packet to the plurality of devices for display.

17. The system of claim 16, wherein the plurality of second objects comprise a plurality of players participated in the sporting event.

18. A method of transmitting data packets in a live data feed, comprising:

receiving, by at least one server comprising one or more processors coupled to memory via a first network, a plurality of first tracking data packets and one or more second tracking data packets according to a plurality of first formats, the plurality of first tracking data packets associated with a first moving object, and the one or more second tracking data packets associated with a plurality of second objects, wherein the plurality of first tracking data packets and the one or more second tracking data packets are obtained using a plurality of radar devices and a plurality of image capturing devices;

generating, by the at least one server, a plurality of first message packets according to a plurality of second formats based on the plurality of first tracking data packets, wherein at least one of the plurality of first message packets includes a speed field containing a speed associated with the first moving object, and another first message packet of the plurality of first message packets includes a distance field containing a distance associated with the first moving object;

generating at least one second message packet according to the plurality of second formats based on the one or more second tracking data packets, wherein the at least one second message packet includes a plurality of position data indicating positions of the plurality of second objects in a field and a timestamp indicating a time that the plurality of position data are generated by a tracking system including the plurality of radar devices and the plurality of image capturing devices, wherein each of the plurality of position data includes a first coordinate, a second coordinate, and a third coordinate associated with a respective second object of the plurality of second objects; and transmitting, in the live data feed via the first network or at least one second network, the plurality of first message packets and the at least one second message packet to a plurality of devices for display, wherein at least the speed and the distance associated with the first moving object and at least one of the plurality of position data associated with a respective second object of the plurality of second objects are displayed.

19. The method of claim 18, wherein the at least one of the plurality of first message packets further includes an angle field containing an angle associated with the first moving object, a direction field containing a direction associated with the first moving object, and a timestamp indicating a time that the speed, the angle, and the direction are generated by the tracking system including the plurality of radar devices and the plurality of image capturing devices, and wherein the at least one of the plurality of first message packets proceeds the another first message packet in the plurality of first message packets according to a predetermined order so as to determine the distance of the first moving object in the another first message packet using at least the speed and the angle of the first moving object in the at least one of the plurality of first message packets.

20. The method of claim 18, wherein the first moving object comprises a ball played in a sporting event, and the plurality of second objects comprise a plurality of players participated in the sporting event, and wherein the plurality of devices comprise an in-venue display and at least one of a television, a personal computer, or a mobile device.

* * * * *